United States Patent
Nouis

(10) Patent No.: US 8,328,669 B2
(45) Date of Patent: Dec. 11, 2012

(54) VARIABLE TOUCH-POINT RADIUS CVT HELIX

(76) Inventor: Randy Gene Nouis, Grand Blanc, MI (US)

(*) Notice: Subject to any disclaimer, the term of this patent is extended or adjusted under 35 U.S.C. 154(b) by 1475 days.

(21) Appl. No.: 10/652,680

(22) Filed: Aug. 29, 2003

(65) Prior Publication Data

US 2004/0043848 A1 Mar. 4, 2004

Related U.S. Application Data

(60) Provisional application No. 60/407,752, filed on Sep. 3, 2002.

(51) Int. Cl.
*F16H 55/56* (2006.01)
*F16H 9/18* (2006.01)
*F16H 61/04* (2006.01)
*F16H 63/04* (2006.01)

(52) U.S. Cl. .................. 474/19; 474/8; 474/10; 474/17

(58) Field of Classification Search ............... 474/8, 46, 474/10–12, 19, 21, 17, 14, 50
See application file for complete search history.

(56) References Cited

U.S. PATENT DOCUMENTS

| | | | | | |
|---|---|---|---|---|---|
| 3,224,287 | A | * | 12/1965 | Gesche et al. | 474/19 |
| 4,585,429 | A | * | 4/1986 | Marier | 474/12 |
| 4,592,737 | A | * | 6/1986 | Dhont | 474/19 |
| 5,403,240 | A | * | 4/1995 | Smith et al. | 474/8 |
| 6,095,937 | A | * | 8/2000 | Aaen | 474/10 |
| 6,379,274 | B1 | * | 4/2002 | Robert | 474/19 |
| 6,502,479 | B1 | * | 1/2003 | Lee | 474/11 |

FOREIGN PATENT DOCUMENTS

DE 10049425 A1 * 7/2002
JP 63-235752 A * 9/1988 ...................... 474/14

* cited by examiner

*Primary Examiner* — Marcus Charles
(74) *Attorney, Agent, or Firm* — James C. McLaughlin; Donald G. Rockwell

(57) ABSTRACT

Methods and devices for tailoring the functional relationship between the shift ratio of a CVT and the radial force (FR) into the cam surfaces of a CVT's helix. Such tailoring may effect downshifting, and the separation of the design of the upshift function from the design of the backshift function. Such tailoring may be effected by schemes that include the use of a helix with other than a constant distance from the rotational axis to the touch point (touch-point radius), a touch-point radius that is a monotonic function of the shift ratio, or a touch-point radius that is a meandering function of the shift ratio.

16 Claims, 6 Drawing Sheets

VARIABLE TOUCH-POINT RADIUS CVT HELIX

CROSS-REFERENCE TO RELATED APPLICATION

This application is a continuation of Ser. No. 10/652,680 filed Aug. 29, 2003 and claims the benefit of Provisional Application 60/407,752 filed Sep. 3, 2002

TECHNICAL FIELD OF THE INVENTION

The present invention is an improvement to a family of belt using, variable speed transmission systems. Such systems include an endless belt power transmission system using a pair of pulleys, such as cone or tapered-face pulleys, with belt receiving surfaces formed by drive faces on axially movable, coaxially confronting members. One pulley, and its ancillary parts, is connected to an engine and the other pulley, and its ancillary parts, is connected to the drive-train. Generally, such transmissions are called continuously variable transmissions, which will be referred to herein by the common abbreviation of "CVT." The pulley system that is connected to an engine (primary clutch) moves its confronting pulley surfaces (and thus the belt's distance from the rotational axis of the primary clutch) in response to the centrifugal force produced by rotational speed acting on a pivoted weight. The pivoted weight is a cam commonly called, and herein called, a camweight or a flyweight. The pulley system that is connected to the drive-train (secondary clutch) moves its confronting pulley surfaces (and thus the belt's distance from the rotational axis of the secondary clutch) in response to the moment developed at a rotating cam and set of cam followers that is reacted into a force acting against the followers. From its appearance, the cam is called a helix and the cam followers are rollers or buttons, extending from one side of a pulley surface, that touch the caroming surfaces of the helix at touch-points. The improvements of the present invention include improvements to major ancillary parts that are used with the drive-train connected pulley. More particularly, the variable speed transmission systems using the improvement of the present invention are provided with a new way to tailor the relationship between shift ratio and the force that squeezes the belt and thus to improve acceleration characteristics of the associated vehicle. The present invention also includes a method of separating the upshift function and the backshift function.

DEFINITIONS

Downshifting: This is a characteristic of a conventional, well designed, automotive-type automatic transmission (not a conventional CVT). It is a movement of the effective transmission gear ratio to a larger value when the throttle is advanced so that the engine may go to higher rpm and, presumably, greater torque to effect greater ground speed. This is an expected, operator-induced result when effecting an increase in ground speed from a more-or-less steady ground speed by increasing the throttle. With a conventional standard (non-automatic) automotive-type transmission one would need to shift to a smaller numbered gear setting (such as $5^{th}$ gear to $4^{th}$ gear) to cause the same effect. CVT using vehicles (including snowmobiles, all-terrain vehicles, and other vehicles) did not have the capability to downshift prior to the present invention.

Shift ratio: This is the rotational speed of the primary pulley divided by the rotational speed of the secondary pulley. Generally, it is proportional to the ratio of engine speed (rpm) to ground speed when the associated vehicle is moving. The span of shift ratio is the range of shift ratios used by a CVT (or like device). A commonly encountered span of shift ratio is from about 3.8 to about 0.8.

Up-shift-force: A force produced at both clutches of a CVT that tends to squeeze together the sheave halves that, in turn, tends to move the belt farther away from the rotational axis of the pulley. On the primary clutch: an increase in up-shift-force moves the CVT toward a smaller shift ratio. On the secondary clutch: an increase in up-shift-force moves the CVT toward a larger shift ratio. On the primary clutch: up-shift-force is due to centrifugal force produced by the flyweights and thus is proportional to engine rpm. On the secondary clutch: up-shift-force is due to torque.

Touch-point radius: Touch-points, as the name suggests, are the spots on a helix's cam surfaces that touch the cam followers. The touch-point radius is the distance from the rotational axis to the touch point. It is a radius. On FIGS. 2a and 3a, the touch-point radius is shown as RR. The present invention encompasses a touch-point radius of the helix modulated by various functions of the shift ratio.

Monotonic function of the shift ratio: As used here, a monotonic function of the shift ratio is defined to be a function that either increases with shift ratio or, alternatively, decreases with shift ratio. Notwithstanding how the expression might be understood elsewhere, a monotonic function of the shift ratio is to be understood as a function of shift ratio having either a positive non-zero slope (change of the function with shift ratio) or a negative non-zero slope. A monotonic function of the shift ratio does not include an essentially constant function of shift ratio.

Meandering function of the shift ratio: As used here, a meandering function of the shift ratio is defined to be a function of shift ratio that is essentially constant for no more than 90% of the span of shift ratio. Thus, a meandering function of the shift ratio must have a slope (change of the function with shift ratio) other than essentially zero for at least 10% of the span of shift ratio. Indeed, a meandering function of the shift ratio may have a slope that oscillates between being positive and being negative with, necessarily, a slope of zero at the transitions between positive and negative slope.

Backshifting: This is a characteristic of a conventional CVT that uses a primary and secondary clutch connected through a drive belt. It is a movement of the CVT system to a larger shift ratio when the output shaft senses an increased load such as is incurred when climbing a steep hill. Such an increase in an externally applied load causes the CVT's secondary clutch, through the helix, to apply more load to the secondary clutch's movable sheave thus forcing the belt up the face of the secondary pulley and down in the primary pulley and resulting in a larger shift ratio. Downshifting, when it exists, is operator induced. Backshifting is induced by an external load and is desirable because it allows the engine to work at an almost constant RPM (which might be the RPM that produces peak power) even when the associated vehicle slows to climb a hill.

Numerous terms are defined herein. It is to be understood that meanings are to be assigned to terms defined herein that correspond to how terms are defined herein or that are consistent with how terms are used herein. Used herein includes the teachings of the drawings. Dictionary definitions are disfavored as they are unlikely to be specific to the usage of one skilled in the art of CVTs.

BACKGROUND

A conventional CVT has two tapered-faced pulleys interconnected with a belt of essentially fixed length. The sheaves of each pulley are able, under control, to move axially. One pulley's shaft is usually connected to the crankshaft of the engine, but the engine might be connected through a gear reduction device. The system including a pulley, and its ancillary parts, that is connected to the engine is called the driving, driver, or primary clutch. The other pulley is connected through a linkage to the vehicle's drive train. It, and its ancillary parts, is called the driven or secondary clutch (see FIG. 1). Of necessity, when the sheaves of either pulley are close together, the associated belt must be located at a relatively large radius (distant from the axis of rotation) and when the sheaves of a pulley are far apart the associated belt must be located at a relatively small radius. It is also apparent that in a well designed system, because of the essentially fixed length of the belt, when the sheaves of one pulley are far apart then the sheaves of the other pulley must be close together. Shift ratio is defined as the ratio of the rotational speed of the primary pulley divided by the rotational speed of the secondary pulley. Larger shift ratios, characteristic of slower vehicle speeds, occur when the sheaves of the primary pulley are far apart and the sheaves of the secondary pulley are close together (rotational speed of the primary pulley is greater than the rotational speed of the secondary pulley). Smaller shift ratios, characteristic of high vehicle speed, occur when the sheaves of the primary pulley are close together and the sheaves of the secondary pulley are far apart (rotational speed of the primary pulley is less than the rotational speed of the secondary pulley).

Some of the ancillary parts of presently available primary clutches include a compression spring, or the like, tending to push the sheaves apart such that, at rest, the sheaves of the primary pulley have opened to allow the belt to lie close to the pulley's rotational axis, effecting a large shift ratio. (Using the invention disclosed in U.S. Pat. No. 6,346,056, it has been shown that it is possible to craft functional primary clutches that do not use a compression spring.) Such a belt position at rest results in the engine having a desirable minimal load when starting. The force produced by this spring increases as the sheaves of the primary pulley get closer together (lower shift ratios) and further compress the spring. Additional ancillary parts of the primary clutch include a set of pivoting flyweights on the primary clutch pushing on a roller, or the like, linked such that the sheave spacing, and thus shift ratio, is responsive to speed and torque needs of the secondary clutch. In the known CVT systems, the net results of the spring and flyweights of the primary clutch include:

enough primary pulley belt side force to allow the engine to start and promptly to get up to approximately a rotational speed where the engine can deliver maximum power to its shaft;
  a belt side force that increases with increasing vehicle speed (decreasing shift ratio) to a peak; and
  a belt side force that then decreases with increasing vehicle speed.

The undesirable result of the just described belt side force is a tendency to lose power because of belt slippage (due to insufficient belt side force) while the vehicle is accelerating to near maximum speed. The desirable result of the just described belt side force is a tendency for the system, in the vicinity of maximum vehicle speed, to increase the shift ratio (deliver more torque) when the vehicle slows down. The invention of U.S. Pat. No. 6,346,056, incorporated herein by reference, substantially cures the undesirable characteristics of a conventional system on the primary clutch side of a CVT, while leaving unchanged the desirable characteristics.

The typical role of the engine is to start, to accelerate promptly to a high rotational speed where the engine can deliver substantial power, and to remain at, or near, that high speed. Power, in this context, is the product of torque and rotational velocity. The role of the CVT is to apportion the power delivered by the engine into a torque and rotational speed portion depending on the vehicle's speed. When the vehicle is moving slowly, the CVT has a high shift ratio, and the torque factor is relatively large. When the vehicle is moving rapidly, the CVT has a smaller shift ratio, and the torque factor is smaller.

It can be an aid to the understanding of what follows to discuss the operation of a conventional secondary clutch with reference to FIG. 1. FIG. 1, and some of its description, is adapted from U.S. Pat. No. 6,149,540. A conventional secondary clutch includes a laterally stationary sheave 52 having an inner belt-engaging surface (which is not visible), sheave 52 being retained on the output shaft 14 by a snap ring 51 and washers 53 (or other suitable mechanism). The laterally movable sheave 56 is also disposed around output shaft 14, the movable sheave 56 having an inner belt-engaging surface 58 that, together with the belt-engaging surface of the stationary sheave 52, defines a generally V-shaped space in which the drive belt is disposed. As part of the mechanism of moving the movable sheave 56, there is a cylindrical cam or helix 10 that has several sets (preferably three) of inclined ramps or cam surfaces 12. Helix 10 is retained on the output shaft 14 by a snap ring 78 (or other suitable fastener) and one or more optional shim washers 79, and is rotationally secured to output shaft 14 in a conventional manner at shaft end 16 of output shaft 14. A coil spring 64 is disposed between helix 10 and the movable sheave 56 statically to urge the movable sheave 56 toward the stationary sheave 52 (other suitable means may also be employed for this function). FIG. 1 shows the use of a pair of washers 80 on opposite sides of a thrust bearing 82, all three components being placed between the coil spring 64 and the movable sheave 56. Alternatively, only a single washer 80 (with no thrust bearing 82) may be employed. The movable sheave 56 holds, and projects towards helix 10, a set of cam followers 60. The cam followers 60 that are shown are in the form of rollers that are secured by countersunk bolts 62. It is also common to use cam followers 60 that are buttons that do not rotate. However constructed, the cam followers engage the cam surfaces 12 of helix 10. The cam surfaces urge the cam followers 60 and, therefore, the movable sheave 56 toward the stationary sheave 52 in response to torque applied by the belt to the movable sheave 56. As the belt is driven by the primary clutch, the belt rotates sheaves 52 and 56. The movable sheave 56 is not directly rotationally secured to the output shaft 14, and thus sheave 56 will rotate with respect to output shaft 14 and helix 10 until the cam followers 60 engage their respective cam surfaces 12 of helix 10. Further torque exerted by the belt on the movable sheave 56 tends to urge the cam followers 60 up the cam surfaces 12, thereby pushing the movable sheave 56 toward the stationary sheave 52, which pinches the belt more. Thus, the more torque is applied to the movable sheave 56 by the belt, the harder the sheaves pinch the belt, assuring good frictional contact between the belt and the sheaves. This action also causes the belt to move radially outwardly between the sheaves.

FIG. 2 shows important dimensions associated with a conventional (prior art) constant radius helix 10. The direction of the belt force (FB) and its reaction arm (PR) is shown for two values of the shift ratio (SR). PR is the distance from the center of the conventional helix to the belt. T is the angle to where the cam followers touch (touch point) the camming surface (12) and RR is the distance from the center of the conventional helix to where the cam followers touch the camming surface. RR is constant. In U.S. Pat. No. 5,403,240 to Smith et al. (the '240 patent, incorporated herein by reference) essentially the same helix is shown in the '240 patent's FIG. 5 and FIG. 10 as is shown as FIG. 2 in this document. Helix 10 of FIG. 2 of this document is called in the '240 patent "rotatable cam member 52" and shown on FIG. 5 as having cam surfaces spaced radially from the axis by a constant amount. Thus Smith's 52 has a constant touch-point radius. Helix 10 of FIG. 2 of this document is also called in the '240 patent "cam member 80" and is shown on FIG. 10 as having cam surfaces spaced radially from the axis by a constant amount. Thus Smith's 80 has a constant touch-point radius. The '240 patent is an example of the prior art use of a helix, by any name, that has an essentially constant touch-point radius, which has been defined previously. The present invention encompasses a helix that does NOT have an essentially constant touch-point radius. As is stated often herein, the helix of the present invention is a helix with other than a constant distance from the rotational axis to the touch point.

The '240 patent does not mention, describe, nor suggest in any way varying the touch-point radius of a helix used in a CVT. The '240 patent appears to be directed to modifications of the slope of the camming surfaces along the longitudinal axis of a helix and does not modify (or suggest modifications to) the radial distance from the rotational axis of the helix to the camming surfaces (the touch-point radius). Smith's '240 patent uses a constant touch-point radius helix with modifications to the slope of the camming surfaces. By contrast, the present invention uses a helix with a variable touch-point radius and does not propose significantly modifying the slope of the camming surfaces.

The present invention deals with the secondary clutch. The present invention involves the recognition of a deficiency of conventional vehicular CVTs (see FIG. 1) and the present invention provides a solution to the deficiency. A deficiency that manifests itself when using conventional snowmobiles and all-terrain vehicles (ATV) that are using conventional CVTs is illustrated with the following chronology (assume level ground and constant traction):

The engine of a conventional CVT using snowmobile is started and the throttle is advanced to a position less than maximum. The snowmobile "upshifts" to a speed less than maximum, say 50% of maximum. "Upshifting" is a term of art that includes a monotonically decreasing shift ratio. The snowmobile cruises at 50% of maximum speed with less than a full throttle setting. While cruising at 50% of maximum, the transmission and engine go to an "overshifting" state. "Overshifting" is a term of art indicating the automatic movement of the shift ratio to a smaller value, with the engine speed changing little and with the engine delivering a reduced amount of torque, when cruising at essentially a constant speed. On the one hand, overshifting is desirable because it reduces component wear and fuel consumption when cruising at essentially a constant speed, but, as we shall see, it has a detrimental effect also. Suddenly, in this chronology, it is desired rapidly to increase snowmobile speed by moving the throttle to a maximum setting. The engine tries to move to maximum rpm and torque, but is impeded by the presence of an inappropriate shift ratio (due in part to overshifting). Since the snowmobile's speed could not change as fast as the rpms of the engine, because of the relative amounts of inertia, and because the conventional secondary clutch is not able to compensate quickly enough, the faster revving engine drives the shift ratio (see definition of shift ratio) to an even smaller value (than that present because of overshifting). An undesirable hesitation results. Here is what is happening:

On reaching a steady speed of less than maximum, the engine is delivering more power than is necessary for steady locomotion (previously, the now excess power had gone into acceleration) and the torque requirements at the secondary decrease. The engine rpm does not significantly change because the throttle does not change so the rpm sensitive primary clutch's forces do not significantly change. However, the torque sensitive secondary clutch's forces decrease resulting in the belt moving to a somewhat smaller shift ratio. This is called "overshifting" in the art. It is said in the art that the cause of overshifting is the inability of the torque sensitive secondary clutch to prevent the rpm sensitive primary clutch from moving the belt into a "higher" (smaller numerically) shift ratio.

Thus, to return to the chronology, with a conventional CVT using vehicle, when the throttle is advanced after achieving a steady speed (and after overshifting has occurred) the engine encounters an impediment in that the power delivered by the engine is mismatched to the needs of the load (the shift ratio is too small). The mismatch causes what will be herein called a "hesitation" in acceleration. Another way to express this is to note that a conventional CVT does not downshift. (See definition of "downshifting.") Hesitation is caused by the secondary clutch not being able to respond quickly and reflecting its reluctance-to-change back to the engine. A too slow conventional secondary clutch stifles the engine at the start of the acceleration period and that lengthens the time to achieve the new, faster speed. Stifling, and the hesitation it produces, is essentially eliminated with the present invention. The present invention allows downshifting with a CVT Here is what is happening near hesitation in more detail and what is needed to cure hesitation: The engine, under the above conditions of a sudden application of throttle, in effect applies a step function increase in torque and a step function increase in speed (rpm) to the primary clutch. This calls for a larger shift ratio (see definition of shift ratio) in order to be able to deliver the increased amount of power from the engine to the load, but, because the speed of the vehicle, and thus the rotational speed of the secondary clutch, has yet to change, a too small shift ratio (partially due to overshifting) is encountered. The somewhat greater engine rpm tends to cause the primary clutch to move the belt towards a smaller shift ratio (the wrong direction). The increase in load on the secondary clutch tends to move the belt so as to effect a larger shift ratio (the right direction to match the engine to the load), however, the relatively steep face angle of the helix's cam surfaces impedes the effectiveness. What is needed to effect acceleration to the new, faster speed in the shortest possible time (to eliminate hesitation) is for the shift ratio to match the engine to the load over the time acceleration is taking place. The shift ratio that matches the engine to the load over the acceleration cycle is a shift ratio that maximizes power transfer from the engine to the load over the acceleration cycle. That gets the most number of Jules of energy from the engine into the forward velocity's kinetic energy in the shortest amount of time. Necessarily, that requires a shift ratio that moves smartly from the over shift setting to a larger value of shift ratio and then, at a rate that is matched to the load and engine, a shift ratio that smoothly decreases such that maximum power transfer occurs all during the smooth decreasing of shift ratio. The present invention effects a close approximation of the ideal shift ratio change by speeding the response of the secondary clutch. The present invention does so, in the preferred embodiment, by using a helix with a radius that decreases with decreasing shift ratio, thus making more flat the belt force versus shift ratio, which allows the secondary clutch more quickly to effect the appropriate shift ratio. Additionally, the use of a helix with a radius that decreases with decreasing shift ratio allows the use of more shallow cam surface angles (without adverse effects on upshifting) and such more shallow cam surface angles also allow the secondary clutch more quickly to effect the appropriate shift ratio when backshifting.

The operator perceived effect of the present invention is that the transition from a speed less than maximum to a higher speed takes place in a shorter period of time. Factors that include differences in engines, mass of the particular snowmobile and its burden, and the specific way that the primary clutch is adjusted, come into determining the specific preferred values to be used by the present invention. Some experimentation is to be expected. The preferred embodiment of the present invention has preferred values that include the functional relationship of the helix's touch-point radius (as used herein) versus shift-ratio and the functional relationship between the helix's cam surface angle (as used herein) versus shift-ratio.

In addition to providing a way to shorten the time required to go from a cruising speed to a faster speed, the present invention also provides a way to enhance the squeezing force on the belt when at the higher speeds (and thus prevent detrimental belt slippage). Some CVTs do not require this capability of the present invention.

It is an objective of the present invention to effect an improved CVT that adjusts shift ratio in a near optimal way when accelerating from a speed less than maximum to a higher speed by implementing downshifting.

It is a further objective of the present invention to provide a system allowing the tailoring of the relationship between shift ratio and the force that squeezes the belt.

It is a further objective of the present invention to provide for reducing the probability of belt slippage at higher ground speeds.

It is a further objective of the present invention to provide an improved system able to be retrofitted to existing CVTs with ease.

It is a further objective of the present invention to provide a way to make more shallow the cam surface angle so as to improve acceleration without deleterious effects.

BRIEF DESCRIPTION

The foregoing and other objectives and advantages are achieved with the apparatus and process disclosed below.

The present invention includes:
the recognition of a deficiency in conventional CVTs;
a new apparatus, changed according to the invention so as to cure the deficiency, that is easily substituted for the conventional apparatus; and
a family of equivalent devices for implementing the discovered principle of the invention.

It is emphasized that because of the wide variability of the applications to which CVTs may be applied, each application is expected to need a different apparatus that conforms to the present invention. In other words, once one in the art understands the present invention, such a person of necessity must perform some testing to adapt the invention to a particular CVT-using application. The specifics of a new apparatus found to be appropriate for a particular application is disclosed below. However, again it is stressed that some experimentation is needed in order to apply the invention because of differing specifications of the associated energy source (engine) and differing riding preferences of users.

The discovered deficiency in conventional CVTs was discussed above. The discovered deficiency is that at least some conventional CVTs, particularly those used in otherwise reasonably designed snowmobiles, are found to hesitate when the throttle is advanced on the engine of a CVT using snowmobile, or the like, that has attained a steady speed below maximum speed. This deficiency manifests itself to the viewer as a hesitation and longer periods of time than expected to advance to a new, faster speed. The prior art compromises the performance when upshifting in order to have a desired backshifting performance because in the prior art the two functions are coupled. One of the desirable attributes of the present invention is the decoupling of upshifting and backshifting performance. Obviously, this attribute of the present invention allows the optimization of both functions, which the prior art can not do.

The cause of the deficiency is the conventional use of a helix with a constant touch-point radius (such as those shown and described in the '240 patent) that offers too much impediment to increases in ground speed from below maximum speed. In order to have sufficient radial force (FR) into the surface of a conventional helix (which has a touch-point radius that is constant) at the smallest shift ratio (so that the belt is pinched tightly enough not to be likely to slip) the force FR is too large over most of the range of shift ratios. The present invention provides a novel way to reduce significantly such an impediment by causing FR to be smaller over most of the range of shift ratios while allowing for FR to be sufficient at the critical smallest shift ratio to ensure that the belt does not slip. In other words, the present invention provides a way to tailor the FR versus shift ratio function so as to provide less impediment to acceleration while adding no deleterious properties. This is also referred to herein as causing up-shift-force versus shaft ratio to be more "flat."

A solution, but by no means the only solution, to the deficiency just described has been found to lie in the use of a helix with other than a constant distance from the rotational axis to the touch point (touch-point radius). It has been found that, for the transmissions investigated, it is preferred to have the size of the radius decrease with decreasing shift ratios. The present invention includes the use of a radius that increases with decreasing shift ratios. An additional effect of the use of a helix radius that decreases with decreasing shift ratios is the ability to use more shallow angles on the cam surfaces, which is a further aid to solving the deficiency and providing benefits to the backshifting function.

The present invention includes other ways of accomplishing what the use of a helix with other than a constant distance from the rotational axis to the touch point accomplishes. A set of nested helix might be used. A helix with wide cam surfaces might be used where those surfaces cooperate with cam followers (such as buttons) that move appropriately from the rotational axis as a function of shift ratio. Any scheme that allows the controlled modulation of the effective radius is encompassed by the present invention. Schemes that allow the modulation of the effective radius during upshifting or during backshifting are encompassed by the present invention. Any scheme for positioning cam followers borne by a movable sheave of a secondary clutch of a CVT so as to be positioned a distance from the rotational axis of the secondary clutch that is a monotonic or meandering function of shift ratio and such that inclined cam surfaces on a helix that is coaxial with the rotational axis of the secondary clutch engage the cam followers (thus causing the touch-point radius to be a monotonic function of shift ratio) is encompassed by the present invention. A CVT that is improved with a helix having a touch-point radius that is a monotonic or meandering function of the shift ratio (including the process of making such an improved helix) is encompassed by the present invention. Note that "touch-point radius," "monotonic function of the shift ratio," and "meandering function of the shift ratio" have been defined herein.

BRIEF DESCRIPTIONS OF THE DRAWINGS

FIG. 5c is a cross section view of a variable radius helix (110) of the present invention taken along 5c-5c of FIG. 5a.

EQUATIONS AND TABLES $$FR = (FB) \times (PR)/RR \quad \text{Equation 1}$$

Secondary Clutch

Constant Radius Helix

[1200 in-lb Torque Input]

TABLE 1

| SR | FB(lb) | PR(in) | RR(in) | FR(lb) |
|---|---|---|---|---|
| 3.80 | 850.4 | 5.362 | 1.772 | 2572 |
| 3.52 | 800.9 | 5.274 | 1.772 | 2384 |
| 3.24 | 751.4 | 5.174 | 1.772 | 2193 |
| 2.96 | 701.9 | 5.061 | 1.772 | 2002 |
| 2.68 | 652.4 | 4.930 | 1.772 | 1817 |
| 2.40 | 602.8 | 4.778 | 1.772 | 1626 |
| 2.12 | 553.2 | 4.599 | 1.772 | 1435 |
| 1.84 | 503.6 | 4.385 | 1.772 | 1247 |
| 1.56 | 453.9 | 4.124 | 1.772 | 1056 |
| 1.28 | 404.3 | 3.799 | 1.772 | 866 |
| 1.00 | 354.7 | 3.384 | 1.772 | 678 |
| 0.80 | 319.2 | 3.008 | 1.772 | 541 |

$$FR = (FB) \times (PR)/RR \quad \text{Equation 2}$$

Secondary Clutch

Variable Radious Helix

[1200 in-lb Torque Input]

TABLE 2

| SR | FB(lb) | PR(in) | RR(in) | FR(lb) |
|---|---|---|---|---|
| 3.80 | 850.4 | 5.362 | 2.244 | 2031 |
| 3.52 | 800.9 | 5.274 | 2.219 | 1904 |
| 3.24 | 751.4 | 5.174 | 2.191 | 1773 |
| 2.96 | 701.9 | 5.061 | 2.159 | 1643 |
| 2.68 | 652.4 | 4.930 | 2.122 | 1517 |
| 2.40 | 602.8 | 4.778 | 2.079 | 1386 |
| 2.12 | 553.2 | 4.599 | 2.028 | 1254 |
| 1.84 | 503.6 | 4.385 | 1.968 | 1123 |
| 1.56 | 453.9 | 4.124 | 1.894 | 989 |
| 1.28 | 404.3 | 3.799 | 1.802 | 852 |
| 1.00 | 354.7 | 3.384 | 1.685 | 713 |
| 0.80 | 319.2 | 3.008 | 1.579 | 608 |

$$SF = (FB) \times (PR)/(RR) \times \tan(A) \quad \text{Equation 3}$$

Figure 1:
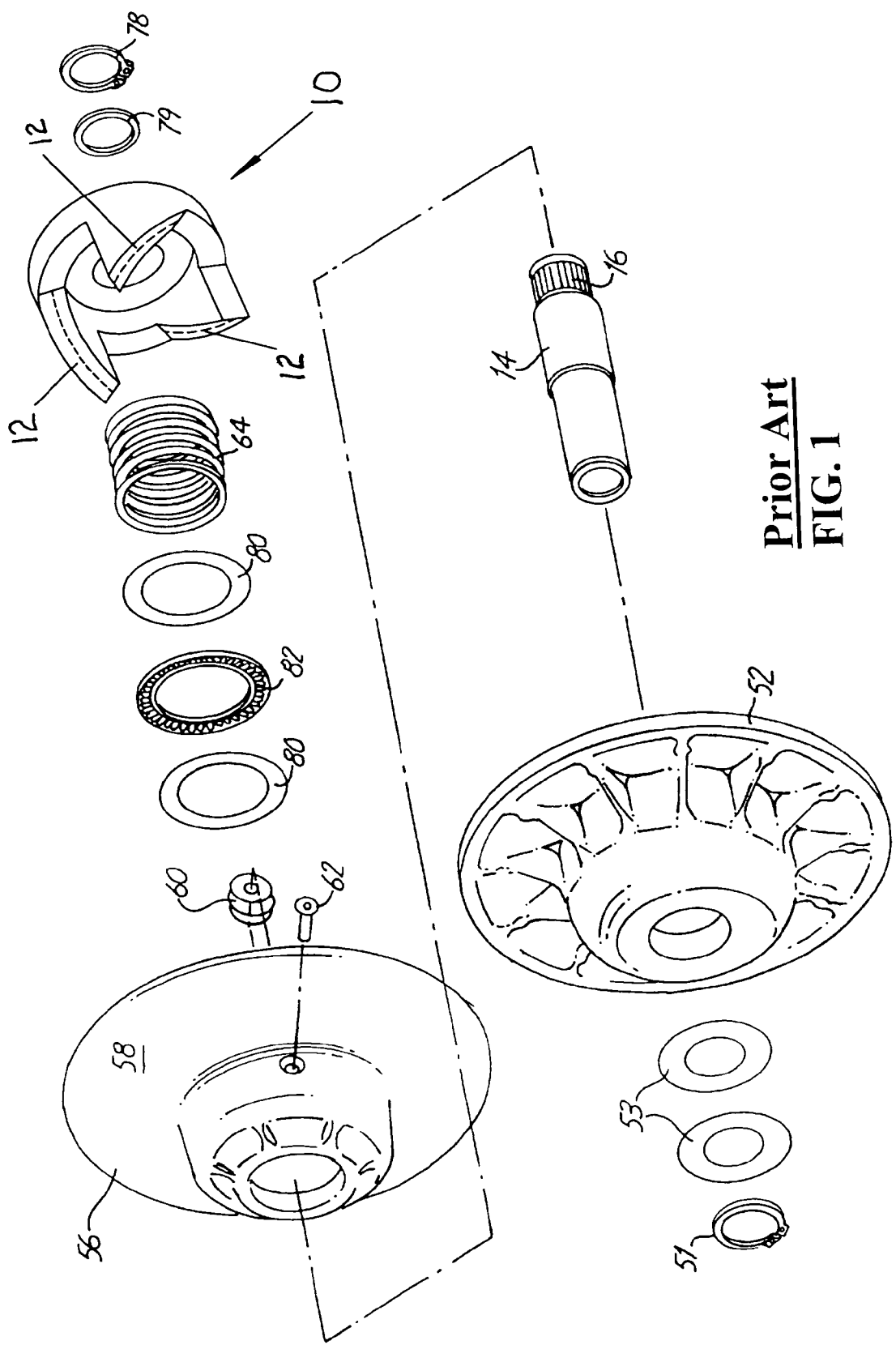
FIG. 1 is an assembly diagram of a CVT's conventional secondary clutch.

Expanded Description of the Drawings, Equations, & Tables:

FIG. 1 is an assembly diagram of a CVT's conventional secondary clutch. It shows a conventional helix (10) and how its camming surfaces (12) cooperate with cam followers (which could be buttons or rollers) attached to the moveable sheave (56). This figure is adapted from FIG. 5 of U.S. Pat. No. 6,149,540.

Figure 2:
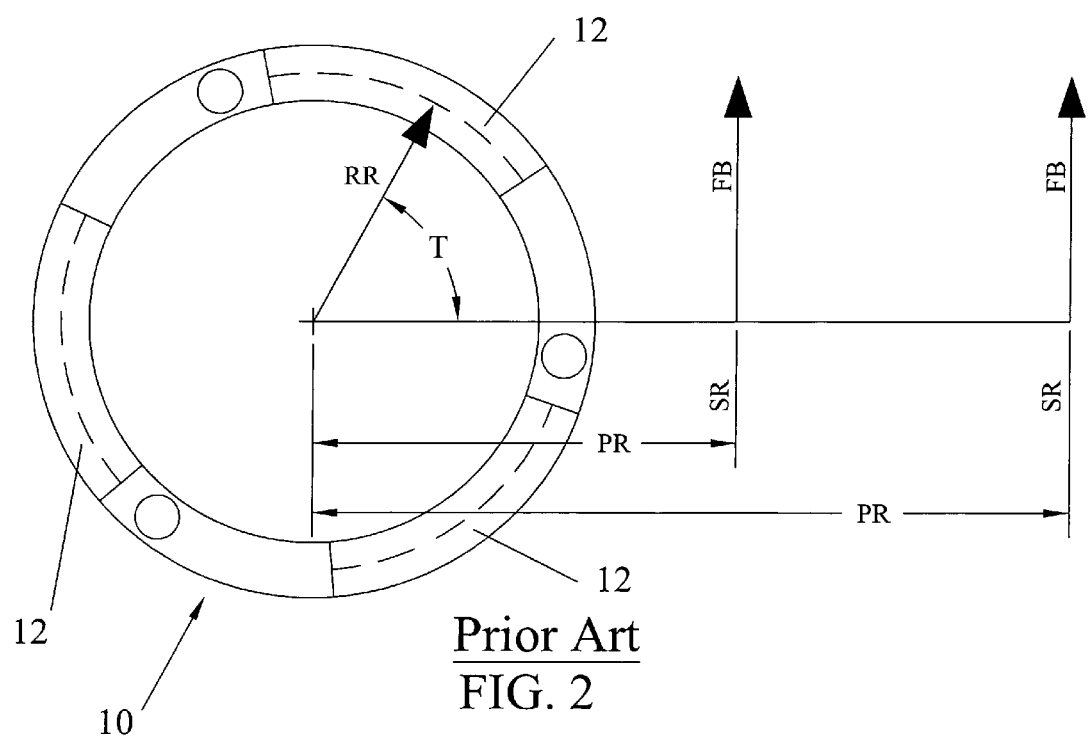
FIG. 2 shows important dimensions associated with a conventional constant radius helix.

FIG. 2 shows important dimensions associated with a conventional constant radius helix. The direction of the belt force (FB) and its reaction arm (PR) is shown for two values of the shift ratio (SR). PR is the distance from the center of the conventional helix to the belt. T is the angle to where the cam followers touch (touch point) the camming surface (12) and RR is the distance from the center of the conventional helix to where the cam followers touch the camming surface. RR is constant.

Equation 1 goes with FIG. 2 and it shows the equation that relates the radial force into the touch point (FR) as a function of FB, PR, and RR. Neglecting any losses, FR=(FB*PR)/RR.

Table 1 goes with FIG. 2 and it shows, in the form of a table, how FR must vary with changing shift ratio (SR) for a particular CVT with the relationship between SR, FB, and PR as shown. (FB*PR)/SR is a constant 1200 in-lb.

Figure 3:
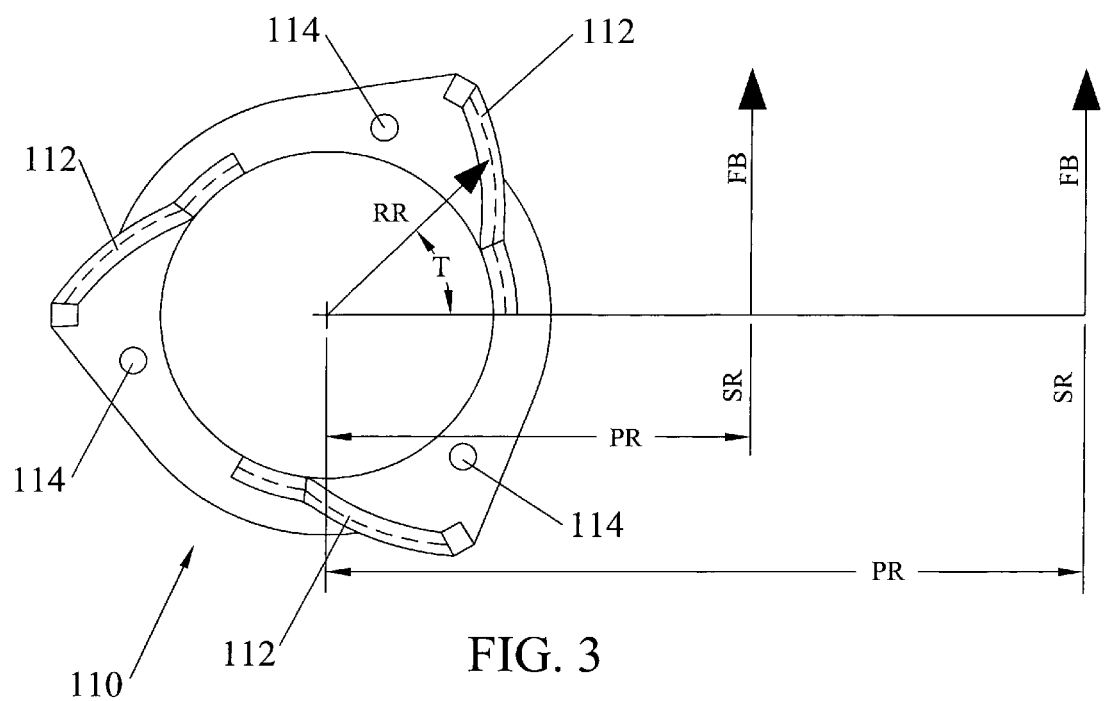
FIG. 3 shows important dimensions associated with a variable radius helix (110) of the present invention that has a dimension RR that decreases with decreasing shift ratio.

FIG. 3 shows important dimensions associated with a variable radius helix (110) of the present invention that has a dimension RR that decreases with decreasing shift ratio. The direction of the belt force (FB) and its reaction arm (PR) is shown for two values of the shift ratio (SR). PR is the distance from the center of the conventional helix to the belt. T is the angle to where the cam followers touch (touch point) the camming surface (112) and RR is the distance from the center of the conventional helix to where the cam followers touch the camming surface.

Equation 2 goes with FIG. 3 and it shows the equation that relates the radial force into the touch point (FR) as a function of FB, PR, and RR. Neglecting any losses, FR=(FB*PR)/RR. This is the same equation as is shown as Equation 1.

Table 2 goes with FIG. 3 and it shows, in the form of a table, how FR must vary with changing shift ratio (SR) for a particular CVT that uses a variable radius helix of the present invention. The relationship between SR, FB, and PR is shown and is the same as shown on Table 1. (FB*PR)/SR is a constant 1200 in-lb. Compare FR as shown on Table 1 and on Table 2.

Figure 4:
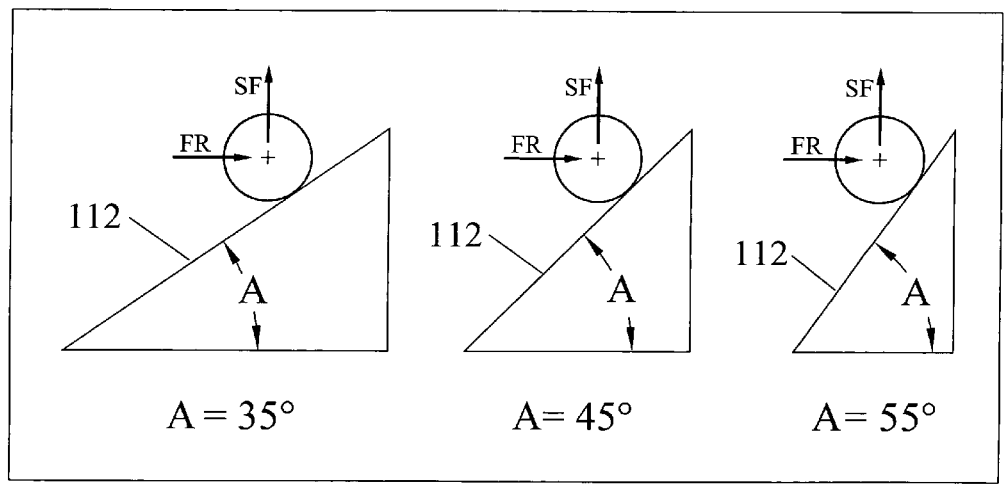
FIG. 4 is a side view of part of a helix's camming surface having three different angles A.

Equation 3 goes with FIG. 4 and it shows the equation that relates the longitudinal force (SF) to the radial force into the touch point (FR), and the angle A (assuming no losses). Angle A is the angle between a plane normal to the axis of rotation and the touch point on the camming surface (112). FR=(FB*PR)/RR, so this equation could also be written: SF=FB/tan(A).

FIG. 4 is a side view of part of a helix's camming surface having three different angles A. The directions of FR and SF are shown at a touch point. Obviously, neglecting losses, SF=FB/tan(A) and thus as A becomes more steep, less of FB is reacted into SF.

Figure 5D:
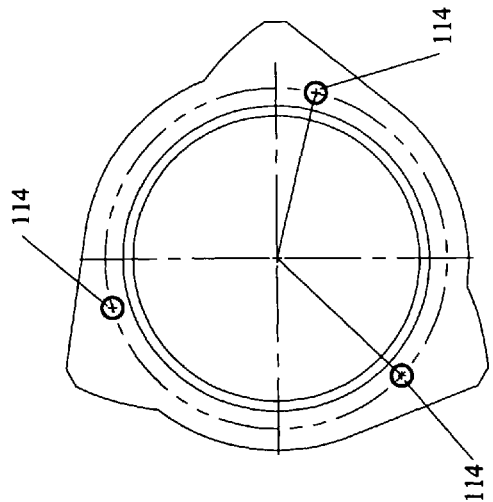
FIG. 5d is a back view of a variable radius helix (110) of the present invention.
Figure 5C:
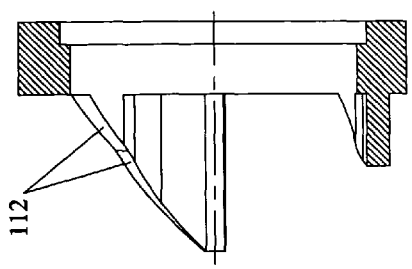
Figure 5A:
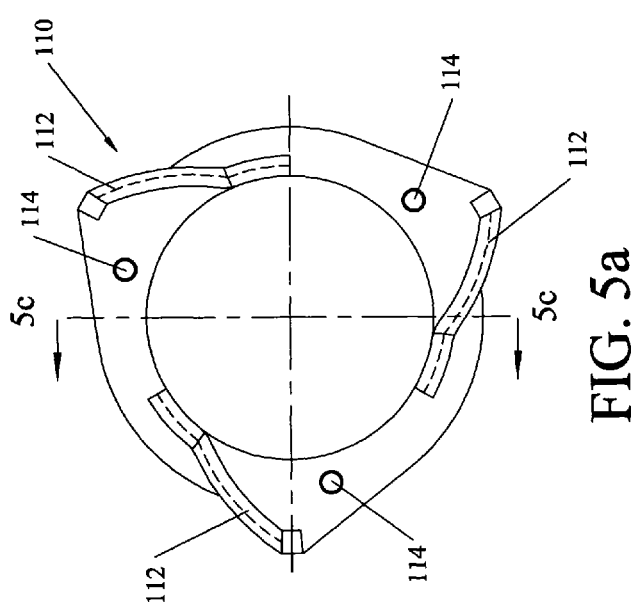
FIG. 5a is a top view of a variable radius helix (110) of the present invention.

FIG. 5a is a top view of a variable radius helix (110) of the present invention.

Figure 5B:
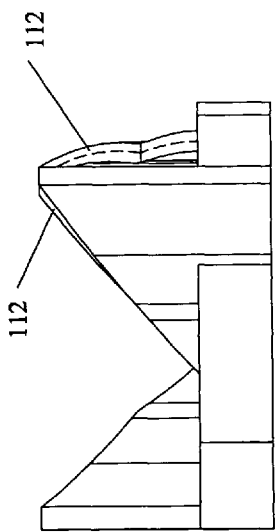
FIG. 5b is a side view of a variable radius helix (110) of the present invention.

FIG. 5b is a side view of a variable radius helix (110) of the present invention.

FIG. 5c is a cross section view of a variable radius helix (110) of the present invention taken along 5c-5c of FIG. 5a.

FIG. 5d is a back view of a variable radius helix (110) of the present invention.

Figure 6:
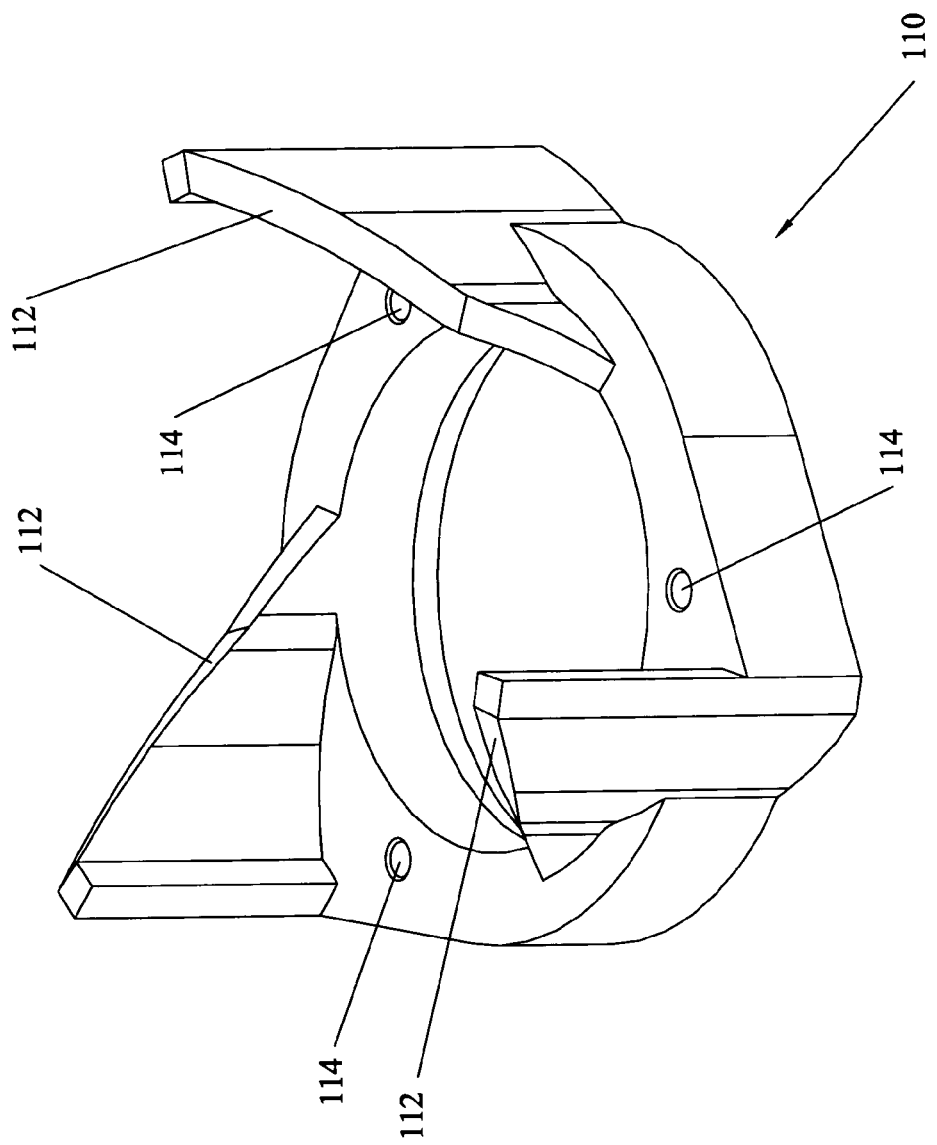
FIG. 6 is an orthogonal view of a variable radius helix (110) of the present invention.

FIG. 6 is an orthogonal view of a variable radius helix (110) of the present invention.

Principle of Operation:

Making use of the figures, one of average skill in the art can follow the forces, moments, torques, power and other basic quantities. Assume for the examples that the engine is delivering a constant torque at a constant rpm to the primary clutch and thus is delivering a constant amount of power. Note that non-SI units are in use including force in pounds, distances in inches, angles in degrees, and similar.

Various quantities present on FIGS. 2-4 are described and clarified below: "SR"=shift ratio; "PR"=distance from rotational axis to where the belt touches the sheave—at the secondary clutch, PR decreases with decreasing SR in a non-linear fashion; "RR"=distance from the rotational axis to touch point on helix (constant in prior art); "FB"=the force tending to stretch the belt where the belt touches the sheave; RPMp=rpm of primary clutch's shaft; RPMs=rpm of secondary clutch's shaft (by definition: RPMp=SR*RPMs); Tp=torque at primary; Ts=torque at secondary; "FR"=the radial force into the inclined surface of the helix; "SF"=longitudinal force caused by the reaction of FR and the "angle" of the helix at the touch point (also called side force); and A=angle of the helix surface at the touch point (cam surface) measured from a normal to the rotational axis (A may be constant with SR or may vary with SR).

It follows from the assumption of constant power being applied by the engine that: RPMp*Tp=a constant, and it follows that RPMp*Tp=RPMs*Ts (neglecting energy lost in friction).

Therefor: Ts=SR*Tp. However, from basic principles, Ts=PR*FB. Thus it follows that Tp=(PR*FB)/SR is constant. In Table 1 and Table 2, this constant is 1200 inch pounds.

Balancing of forces at the helix leads to: FR=(FB*PR)/RR (the equation of Equation 1 and 2).

Note FIG. 4. Reacting FR against the cam surface's slope (angle A) yields: SF=FR/tan(A) (making the usual assumption). FR is found above. Thus: SF=(FB*PR)/(RR*tan(A)), which is the equation of Equation 3.

Up-shift-force at the secondary clutch's pulley is proportional to SF, which is proportional to FR. (Because of the necessary flaring angle of the sheaves, up-shift-force is not equal to SF.) SF is inversely proportional to RR and to tan(A). Both RR and A are part of the helix. They may be adjusted. Thus one may adjust the up-shift force at the secondary. Note the last column of Table 1 (prior art with a constant RR) and the last column of Table 2 (present invention that changes only RR from being constant to being variable). One with any skill in the art will see that the present invention, by varying RR, allows one to tailor the functional relationship between FR (and thus necessarily SF) and SR. The utility of such tailoring has been previously established. The ability of the present invention to produce a function of up-shift-force versus shift ratio that is more "flat," and yet able to pinch the belt more tightly at the critical smallest shift ratio, is clear. Obviously, changes to A may also be effected to benefit further the system. Varying RR, and possibly A, with SR, is not the only way to implement the present invention.

The present invention provides one skilled in the art with the ability to tailor or to optimize upshift performance essentially independently of backshift performance. This decoupling property of the present invention allows, for the first time, for the optimization of each function.

Preferred Apparatus and Method:

FIGS. 5a-6 show the appearance of a helix system according to the present invention for use with a particular Arctic Cat vehicle. FIG. 5a clearly shows a variable radius helix 110 with cam surfaces 112 and mounting holes 114. The particular implementation of the present invention shown on FIGS. 3, and 5a-6 has the radius (RR) of the cam surfaces 112 modulated (varying) and has those surfaces having two different pitches (seen as A in FIG. 4). Since, over a small part of the expected span of shift ratio, RR as shown on FIGS. 3, and 5a-6 has an essentially constant RR, it follows that the modulating function is a meandering function of shift ratio.

As an example of what is believed to be the best helix design using the modulated radius technology (which is part of the present invention) for use with the transmission found in the 2002 Yamaha SRX 700 snowmobile has these characteristics:

1) The touch point starts at 58 mm from the shaft center
2) The touch point ends at 37 mm from the shaft center
3) The secondary opens 30 mm from start of shift to end of shift
4) Angle A (the angle of the cam surface) is a constant 42 degrees during the 30 mm shift The start of shift is when the shift ratio is 3.8 and the end of shift point is when the shift ratio is 0.8. This design modulates the touch-point radius with a monotonic function of shift ratio. Many tuning variables need to be taken into account when calibrating a system for maximum performance or to satisfy some other requirement. Centrifugal force, and spring rate are among those properties that must be considered.

It is emphasized again that one of average skill in the art, privy to the present invention, must perform some experimentation to produce a device according to the present invention that is deemed satisfactory for a particular application. Particular applications may include various riding preferences on the same machine that each lead, after some experimentation, to different devices according to the present invention. Using the above provided beginning and ending touch point distances from the center of the shaft (RR) and the same cam surface angles (A) as used by the conventional helix that is being replaced, will usually result in a reasonable starting device. Alternatively, a reasonable starting device may be implemented by: using an RR that is somewhat greater than used by the helix that is being replaced when SR is at its maximum; using an RR that is somewhat smaller than used by the helix that is being replaced when SR is at its minimum;

smoothly changing RR between the two extreme values just described; and using the same cam surface angles as used by the conventional helix that is being replaced. An example is shown on Tables 1 and 2 where RR of the new helix is about 1.27 times the (constant) RR of the old helix when SR=3.80 and RR is about 0.89 times the (constant) RR of the old helix when SR=0.80. This example illustrates what is reasonably meant by somewhat greater and somewhat smaller.

The use of the present invention's variable radius makes possible a degree of tailoring not previously available. Techniques other than changing the actual radius of the helix may also be used to effect the same principles.

I claim:

1. A continuously variable transmission (CVT) including a primary clutch, a secondary clutch with a fixed sheave and a movable sheave that bears cam followers, wherein the improvement comprises:
   inclined cam surfaces on a helix that is coaxial with the rotational axis of the secondary clutch that engage the cam followers at a touch-point radius that is a monotonic function of the shift ratio.

2. A CVT according to claim 1 wherein said monotonic function is such that said touch-point radius decreases with decreasing shift ratio.

3. A CVT according to claim 1 wherein said monotonic function is such that said touch-point radius decreases with increasing shift ratio.

4. A CVT according to claim 1 wherein said monotonic function is such that:
   said touch-point radius is approximately 58 millimeters for a shift ratio of 3.8; and
   said touch-point radius is approximately 37 millimeters for a shift ratio of 0.8.

5. A CVT according to claim 4 wherein said inclined cam surfaces are inclined approximately 42 degrees (angle A).

6. A CVT according to claim 1 wherein said monotonic function is such that:
   said touch-point radius is approximately 2.244 inches for a shift ratio of 3.8; and
   said touch-point radius is approximately 1.579 inches for a shift ratio of 0.8.

7. A continuously variable transmission (CVT) including a helix-using-secondary-clutch that uses a helix-having-an-essentially-constant-touch-point-radius, wherein the improvement comprises:
   Replacing the helix with a helix having a touch-point radius that is a monotonic function of the shift ratio.

8. A CVT according to claim 7 wherein said monotonic function is such that said touch-point radius decreases with decreasing shift ratio.

9. A CVT according to claim 7 wherein said monotonic function is such that said touch-point radius decreases with increasing shift ratio.

10. A CVT according to claim 7 wherein said monotonic function is such that:
    said touch-point radius is approximately 58 millimeters for a shift ratio of 3.8; and
    said touch-point radius is approximately 37 millimeters for a shift ratio of 0.8.

11. A CVT according to claim 7 wherein said monotonic function is such that:
    said touch-point radius is approximately 2.244 inches for a shift ratio of 3.8; and
    said touch-point radius is approximately 1.579 inches for a shift ratio of 0.8.

12. A process for improving a continuously variable transmission (CVT) that includes a secondary clutch that uses a helix-having-an-essentially-constant-touch-point-radius of R millimeters and a cam surface, comprising the steps of:
    forming a new helix having a touch-point radius that is somewhat greater than R millimeters when the shift ratio is at maximum, and a smooth transition of touch-point radius to a touch-point radius that is somewhat smaller than R millimeters when the shift ratio is at minimum, and
    having a cam surface; and
    replacing the helix-having-an-essentially-constant-touch-point-radius with said formed helix.

13. A process according to claim 12 wherein said touch-point radius that is somewhat greater than R when the shift ratio is at maximum is approximately 1.27 times R, and
    said touch-point radius that is somewhat smaller than R when the shift ratio is at minimum is approximately 0.89 times R.

14. A process according to claim 12 wherein said smooth transition of touch-point radius follows a function of the shift ratio selected from the group consisting of a monotonic function of the shift ratio and a meandering function of the shift ratio.

15. A continuously variable transmission (CVT) including a helix using secondary clutch, wherein the improvement comprises:
    Substituting a helix having a touch-point radius that is modulated by a function of the shift ratio selected from the group consisting of a monotonic function of the shift ratio and a meandering function of the shift ratio.

16. An improved continuously variable transmission (CVT) including a primary clutch, a secondary clutch with a fixed sheave and a movable sheave that bears cam followers, the cam followers engaging with inclined surfaces of a helix at a touch-point radius, wherein the improvement comprises the process of:
    providing the CVT with a helix having means for varying the touch-point radius such that the touch-point radius is a monotonic function of shift ratio.

* * * * *